(12) United States Patent
Lin et al.

(10) Patent No.: US 7,139,750 B2
(45) Date of Patent: Nov. 21, 2006

(54) SYSTEM AND METHOD FOR WHERE-USED SEARCHES FOR DATA STORED IN A MULTI-LEVEL HIERARCHICAL STRUCTURE

(75) Inventors: Raymond Lin, San Jose, CA (US); Min Liu Ye, San Jose, CA (US)

(73) Assignee: Agile Software Corporation, San Jose, CA (US)

( * ) Notice: Subject to any disclaimer, the term of this patent is extended or adjusted under 35 U.S.C. 154(b) by 587 days.

(21) Appl. No.: 10/389,085

(22) Filed: Mar. 13, 2003

(65) Prior Publication Data

US 2003/0177114 A1    Sep. 18, 2003

Related U.S. Application Data

(60) Provisional application No. 60/364,174, filed on Mar. 13, 2002.

(51) Int. Cl.
*G06F 17/30* (2006.01)

(52) U.S. Cl. .......................... 707/3; 707/101; 707/102; 707/103 R; 707/104.1

(58) Field of Classification Search .................... 707/3, 707/10, 104.1, 101, 103 R, 102
See application file for complete search history.

(56) References Cited

U.S. PATENT DOCUMENTS

| | | | |
|---|---|---|---|
| 6,192,373 B1* | 2/2001 | Haegele | 707/104.1 |
| 6,567,812 B1* | 5/2003 | Garrecht et al. | 707/100 |
| 6,684,222 B1* | 1/2004 | Cornelius et al. | 707/104.1 |
| 6,757,673 B1* | 6/2004 | Makus et al. | 707/3 |
| 2005/0015381 A1* | 1/2005 | Clifford et al. | 707/100 |
| 2005/0108200 A1* | 5/2005 | Meik et al. | 707/3 |

* cited by examiner

*Primary Examiner*—Thuy N. Pardo
(74) *Attorney, Agent, or Firm*—Stevens Law Group (57) ABSTRACT

A system for and method of searching for data in a multi-level hierarchical database coupled with a search engine is disclosed. The invention allows not only direct where-used searches in a multi-level hierarchical database for modified objects in a hierarchical database, but also indirect where-used searches for a target object or objects that are modified directly by a user or that are modified indirectly due to modifications of an object and objects with a higher hierarchy than the target object or objects.

12 Claims, 6 Drawing Sheets

| ID | ParentID | ChildID | ChangeIN | ChangeOUT | PriorBOM | Flags |
|---|---|---|---|---|---|---|
| 1 | P01 | P02 | 0 | 0 | 0 | 00011 |
| 2 | P01 | P03 | 0 | 0 | 0 | 00011 |
| 3 | P01 | P04 | 0 | 0 | 0 | 00011 |
| 4 | P02 | P05 | 0 | 0 | 0 | 00011 |
| 5 | P02 | P06 | 0 | 0 | 0 | 00011 |
| 6 | P03 | P07 | 0 | 0 | 0 | 00011 |
| 7 | P03 | P08 | 0 | 0 | 0 | 00011 |
| 8 | P04 | P09 | 0 | 0 | 0 | 00011 |
| 9 | P04 | P10 | 0 | 0 | 0 | 00011 |

| ID | ParentID | ChildID | ChangeIN | ChangeOUT | PriorBOM | Flags |
|---|---|---|---|---|---|---|
| 1 | P01 | P02 | 0 | 0 | 0 | 00011 |
| 2 | P01 | P03 | 0 | 0 | 0 | 00011 |
| 3 | P01 | P04 | 0 | 0 | 0 | 00011 |
| 4 | P02 | P05 | 0 | 0 | 0 | 00011 |
| 5 | P02 | P06 | 0 | 0 | 0 | 00011 |
| 6 | P03 | P07 | 0 | 0 | 0 | 00011 |
| 7 | P03 | P08 | 0 | 0 | 0 | 00011 |
| 8 | P04 | P09 | 0 | 0 | 0 | 00011 |
| 9 | P04 | P10 | 0 | 0 | 0 | 00011 |

| ID | ParentID | ChildID | ChangeIN | ChangeOUT | PriorBOM | Flags |
|----|----------|---------|----------|-----------|----------|-------|
| 1 | P01 | P02 | 0 | 0 | 0 | 00011 |
| 2 | P01 | P03 | 0 | 0 | 0 | 00011 |
| 3 | P01 | P04 | 0 | 0 | 0 | 01011 |
| 4 | P02 | P05 | 0 | 0 | 0 | 00011 |
| 5 | P02 | P06 | 0 | 0 | 0 | 00011 |
| 6 | P03 | P07 | 0 | 0 | 0 | 00011 |
| 7 | P03 | P08 | 0 | 0 | 0 | 01011 |
| 8 | P04 | P09 | 0 | 0 | 0 | 10011 |
| 9 | P04 | P10 | 0 | 0 | 0 | 10011 |

| ID | ParentID | ChildID | ChangeIN | ChangeOUT | PriorBOM | Flags |
|---|---|---|---|---|---|---|
| 1 | P01 | P02 | 0 | 0 | 0 | 00011 |
| 2 | P01 | P03 | 0 | 0 | 0 | 00011 |
| 3 | P01 | P04 | 0 | 0 | 0 | 01011 |
| 4 | P02 | P05 | 0 | 0 | 0 | 00001 |
| 5 | P02 | P06 | 0 | 0 | 0 | 00101 |
| 6 | P03 | P07 | 0 | 0 | 0 | 00011 |
| 7 | P03 | P08 | 0 | 0 | 0 | 01011 |
| 8 | P04 | P09 | 0 | 0 | 0 | 10011 |
| 9 | P04 | P10 | 0 | 0 | 0 | 10011 |
| 10 | P02 | P6 | C1 | C1 | 5 | 00000 |
| 11 | P02 | P11 | C1 | 0 | 0 | 00001 |

| ID | ParentID | ChildID | ChangeIN | ChangeOUT | PriorBOM | Flags |
|---|---|---|---|---|---|---|
| 1 | P01 | P02 | 0 | 0 | 0 | 00011 |
| 2 | P01 | P03 | 0 | 0 | 0 | 00011 |
| 3 | P01 | P04 | 0 | 0 | 0 | 01011 |
| 4 | P02 | P05 | 0 | 0 | 0 | 00011 |
| 5 | P02 | P06 | 0 | 0 | 0 | 00011 |
| 6 | P03 | P07 | 0 | 0 | 0 | 00011 |
| 7 | P03 | P08 | 0 | 0 | 0 | 01011 |
| 8 | P04 | P09 | 0 | 0 | 0 | 10011 |
| 9 | P04 | P10 | 0 | 0 | 0 | 10011 |
| 10 | P02 | P6 | C1 | C1 | 5 | 00000 |
| 11 | P02 | P11 | C1 | 0 | 0 | 00011 |

FIG. 6B

SYSTEM AND METHOD FOR WHERE-USED SEARCHES FOR DATA STORED IN A MULTI-LEVEL HIERARCHICAL STRUCTURE

RELATED APPLICATIONS

The present application claims the benefit of U.S. Provisional Patent Application Ser. No. 60/364,174, filed on Mar. 13, 2002 and entitled "WHERE-USED SEARCHES", the contents of which are hereby incorporated by reference.

TECHNICAL FIELD

The invention generally relates to database and other search mechanisms and, more particularly, to such searches related to hierarchical data structures.

BACKGROUND

Many companies work with highly complex, distributed supplier networks to deliver products profitably to the global marketplace. To gain a competitive edge, companies have shifted to horizontal or completely outsourced manufacturing models. As companies increasingly depend on suppliers to provide the critical parts and assemblies that make up their products, the effective management of these parts and the approved suppliers of the parts are paramount to success. Price changes, supply shortages, delivery, manufacturability, and quality problems associated with these parts can all impact a company's ability to deliver its products. Business partners work together to ensure their products' components meet the technical, business, and supply chain requirements of their products.

A bill of materials is commonly used in the product sourcing and product manufacturing processes. A bill of materials typically contains data regarding various components, elements, services, processes, etc. that make up a product, a service, a process, a project, or the like. Parties involved in the manufacture and distribution of various parts and components, such as engineers, contract manufacturers and supply chain partners would make inquiries regarding a particular component.

Traditional searches typically operate on a two-dimensional relational data structure in which search inquires include only one level of hierarchical data values. For example, a typical conventional search inquiry states "Give all assemblies whose product line is Scorpio." Only one hierarchical level, i.e., all assemblies for a product line, is involved in this inquiry.

In addition, traditional searches make inquiries on a target in its unchanged state, but it is not effective in searching for a search target that has multiple revisions. For example, a traditional search for "all assemblies whose contain indirectly other assemblies that contain all pending released revisions" is awkward and inefficient.

However, sometimes engineers, contract manufacturers and supply chain partners often need to inquire whether a particular component is being used by other assemblies, where it is being used, what the top-level assembly is for the component, and which revision of the assembly it is etc. Conventional search operations based on two-dimensional data structure having only one level of hierarchy is not suitable for this type of data search for data having multiple revisions in a hierarchical structure.

Therefore, there is a need for a system and a method for performing where-used searches for data with multiple revisions in a multi-level hierarchical structure in an efficient manner.

BRIEF DESCRIPTION OF THE DRAWINGS

The invention is illustrated by way of example and not limitation in the figures of the accompanying drawings. The same numbers are used throughout the figures to reference like components and/or features.

DETAILED DESCRIPTION

The invention is directed to a system and a method for where-used searches in a hierarchical database. Unlike database systems in prior art, the invention allows fast, efficient and convenient where-used search for data with multiple revisions in a multi-level hierarchical database. A system and corresponding method are provided for searching for data in a multi-level hierarchical database. The invention allows not only direct where-used searches in a multi-level hierarchical database for modified objects in a hierarchical database but also indirect where-used searches for a target object or objects that are modified directly by a user or that are modified indirectly due to modifications of an object and objects with a different status on the hierarchy than the target object or objects.

The multi-level hierarchical database system in the invention includes an indicia associated with various status of more than one modification of data values having hierarchical relationships. The invention further includes modifying entries in the database in response to modifications of data by a user and migrating modified data of the hierarchical structure to generate entries for the database.

Examples are described below that pertain to where-used searches in relational databases and to where-used searches in a BOM table used in a product sourcing and manufacturing process. It will be appreciated, however, that this is illustrative of only one utility of the invention, and that the invention has greater applicability. It will be appreciated by those skilled in the art that the invention is applicable to any type of hierarchical data search.

A hierarchical data structure is a data structure in which a hierarchical relationship exists among data values. For example, in a product line a BOM table may identify various assemblies, sub-assemblies, components and elements that make up the product; data values associated with an assembly is higher in hierarchy than that associated with a sub-assembly; and similarly, data values associated with a sub-assembly is higher in hierarchy than that associated with a component. As used herein, a "bill of materials" is any collection of data that identifies various components, elements, services, or processes that make up a product, a service, a process, or, a project. For example, a bill of materials may identify multiple components that are used to assemble a finished product and various other information regarding multiple components such as part numbers, quantities, and the manner in which the multiple components are assembled.

Hierarchical data relationships also exist in other types of hierarchical situations. For example, supply chain partners may need to find out the status of supplies of parts in the supply pipeline. Various parts may display a hierarchical relationship. A business may produce an actual physical product, such as a computer made up of various component parts and systems, a food product made up of ingredients, elements and compounds, a pharmaceutical product such as drugs made up of elements, compounds and chemicals according to predetermined recipes, or other products that involved outsourced items or components. Different products, parts and systems may display hierarchical relationships. Similarly, business processes may include business oriented operations such as shipping, procurement, purchasing, and other operations. Project management may include management of business plan development, architecting a building, process plant or other structure, or other projects. Different business processes or projects may also display hierarchical relationships.

For hierarchical data searches for workflows associated with services or project management, individual services or tasks can be considered components for purposes of an embodiment of the invention. A service database may contain any number of entries related to any number of products, services, processes or projects. The invention provides a means for search for the status of the workflow of components, whether it is a manufactured product or a service based business, or some other type of project management. Hierarchical data entries may identify multiple services that are performed to complete a particular project and specifies how the multiple services or projects are to be performed and how the results of the multiple services are used to complete the particular project.

In addition, hierarchical data situations exist even in ordinary hierarchical situations such as data values associated with a person's identification and his or her physical traits, in which the data values of the former is higher in hierarchy than that of the latter.

A search inquiry may be made to search for multiple hierarchical levels of data values. For example, a multiple hierarchical level search request may include a statement such as "give all assemblies that contain components whose product line is "Scorpio". In this search request, all assemblies, each of which is a parent object, has the higher hierarchy than all components, which are child objects. Such an inquiry searches for data in a multiple-level hierarchical relationship.

A search inquiry may also be made to search for data having multiple revisions. For example, a search inquiry for "all assemblies whose contain indirectly other assemblies that contain all pending released revisions" requires a return of results having multiple modifications and revisions.

Accurate and efficient answers to inquiries involving multiple revisions in multiple-level hierarchical data structure can provide valuable information about the component for further data analysis and lead to efficient and convenient operations such as bulk changes. The invention allows efficient where-used searches of data with multiple revisions in a multi-level hierarchical data structure and has a variety of advantages such as accuracy, cost reduction and inventory control etc.

Figure 1:
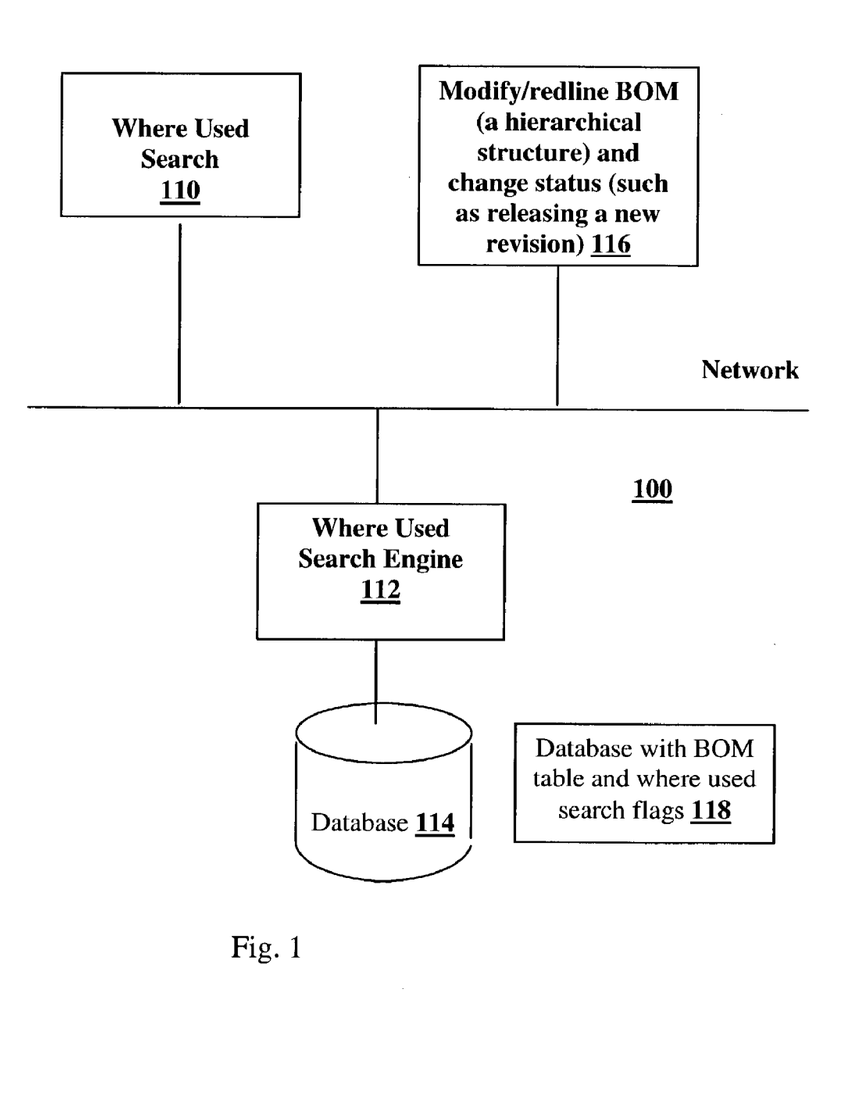
FIG. 1 is a block diagram illustrating a computer network system implementing a where-used search according to one embodiment of the invention.

Referring now to FIG. 1, a system 100 configured to perform searches of data with hierarchical relationships according to the invention is illustrated. The entity from which the where-used search originates 110 is connected with other system entities via a network. One such entity is a module 116, configured to modify objects within the hierarchical structure, such as modifying and redlining a BOM, changing the status of objects such as indicating the release of a new revision, and other changes. The where-used search engine 112 also communicates with the network, as well as database 114. The database may include database tables and where-used search flags 118, which are discussed in more detail below.

In operation, the system 100 may perform a method of a where-used search for hierarchical data according to one embodiment of the invention includes: issuing a where-used search request (e.g., by a user, or a software program); after a search engine receiving the search request, the search engine performing a where-used search in a database constructed according to one embodiment of the invention; and, the search engine returning the where-used search result (e.g., for display).

Various modifications can be made to the hierarchical data, such as deletion, addition, redline deletion, redline addition (e.g., adding or deleting a part or assembly), and other modifications. It will be appreciated by those skilled in the art that the presence of "redline" indicates that the associated modification is subject to confirmation, approval or finalization. When a user makes modifications on the hierarchical data, one or more where-used flags are updated; and, the corresponding hierarchical data structure is modified accordingly. The modifications to the where-used flags allow the where-used search to be performed correctly after the modifications to the hierarchical data, e.g., after the addition or deletion of a part or assembly.

Existing data on other database can be migrated for where-used search according to embodiments of the invention. Once migrated, the where-used flags for supporting where-used searches are established. The data then becomes suitable for performing where-used searches according to embodiments of the invention.

A where-used search engine 112 performs searches in the database according to the invention and generates a where-used search result. The result of a where-used query is typically a list of items (e.g., assembly objects). For example, a search result may include attributes such as item type, item number, item description, item life cycle phase, and item revision number.

A search request may be stated in various different ways. For example, a user may initiate a where-used search for hierarchical data by issuing a where-used search request 10 in a search query box. A search request may include a statement such as "give all assemblies that contain directly or indirectly, other assemblies or components whose product line is Scorpio". It will be appreciated by those skilled in the art that a where-used search for hierarchical data is not limited to data values in a BOM table of product lines.

A query includes a single query criterion clause, multiple criterion clauses, compound criteria clauses or a special clause. A single query criterion is an indicia of criteria in the form of a clause may consist of an attribute, a relational operator and an operand. Possible numerical values of these items may depend on the type of the query. An attribute is a list of all searchable attributes for the selected query type. A relational operator is a list of all relational operators applicable to the selected attribute. An operand is a list of all possible values for the attribute.

Multiple criterion clauses include more than one criterion clauses. A compound criterion clause forms when one or more logical operators group together multiple criterion clauses. A logical operator is either "and" or "or". A compound criteria is a set of criterion clauses that are connected with logical operators "and" or "or".

A where-used query is a set-oriented query because it involves hierarchical databases including BOMs and assemblies. For this reason, a where-used query may involve set operators. A set operator is used to specify the inclusion or exclusion of assembly objects that match the given criteria. The semantics of each set operator is described as following:

1) Union. A union is a logical "or" semantics, which is used to augment a result set with another set of objects. For example, "Give me a list of assemblies whose BOM tables contain 'Part 111' or contain 'Part 222'" is a "Union" operation;

2) Intersection. An intersection is a logical "and" semantics, which is used to further qualify a result set. For example, "Give me a list of assemblies whose BOM table contains 'Part 111' and 'Part 222'" is an "Intersection" operation;

3) Difference. A difference is a logical exclusion, which is used to exclude a subset of a result set. For example, "Give me a list of assemblies whose BOM table contains 'Part 111' but not 'Part 222'" is a "Difference" operation.

While logical operators group multiple criterion clauses to form a compound criterion clause that identifies a particular matching condition, a set operator connects these compound criteria together to expand or limit the query result set. For example, in general, the following syntax is true for where-used query criteria clauses:

<Where-used query criteria clauses>::=<compound criteria clauses>[<set operator><compound criteria clauses>]*<compound criteria clauses>::=<criterion clause>[<logical operator><criterion clauses>]*<criterion clause>::=<attribute><relational operator><operand><set operator>::=UNION|INTERSECTION|DIFFERENCE<logical operator>::=AND|OR For example, the query "Give me a list of assemblies whose BOM table contains 'Part 111' but do not contain 'Part 222'" will be specified in the query builder by two criteria clauses connected by a set operator:

Query type='Item';
Item search option='Where-used One Level Latest Released Revision';
Criterion Clause 1:
Attribute='Item_number'
Relational operator='equal to'
Operand='Part 111'
Logical operator=''
Set operator='difference'
Criterion Clause 2:
Attribute='Item_number'
Relational operator='equal to'
Operand='Part 222'
Logical operator=''
Set operator=''

In this example, a result set by first categorizing all the assemblies in the system can be divided into four sets: some whose BOM tables contain 'Part 111' only, some whose BOM table contains 'Part 222' only, some whose BOM tables contain both parts and some whose BOM tables contain neither part. This specific query focuses on the first set of assemblies.

The following VEN diagram and corresponding description above helps to illustrate the relationships among the operator concepts.

In addition to the above three where-used query clauses, a special case of the where-used query is one without a criterion. A special where-used query returns all the items that have a BOM.

In one embodiment, there are common types of where-used queries. Examples include, but are not limited to: 1) Where-used All Levels. A "Where-used All Levels" query returns all assemblies that the latest-released revision of BOM table contains, directly or indirectly, all items that match the given criteria; 2) Where-used Top-level Assemblies Only. A "Where-used Top-level Assemblies Only" query returns a list of top-level assemblies that the latest-released revision of BOM table contains, directly or indirectly, items that match the given criteria; 3) Where-used One Level Latest Released Revision. A "Where-used One Level Latest Released Revision" query returns a list of assemblies that the latest-released revision of BOM table directly contains items that match the given criteria; 4) Where-used One Level Latest Revision. A "Where-used One Level Latest Revision" query returns a list of assemblies that the latest revision of BOM, released or unreleased, directly contains items that match the given criteria; and 5) Where-used One Level All Released Revisions. A "Where-used One Level All Released Revisions" query returns a list of assemblies whose one or more released revisions of BOMs that directly contain items that match the given criteria.

SQL statements may be used as basis for each of the different data access methods. Various databases that support the hierarchical relationship between data values, especially rational databases such as SQL server, postscript, Sybase, Informix and IBMDB2, may be used to implement the invention in various embodiments.

Figure 2:
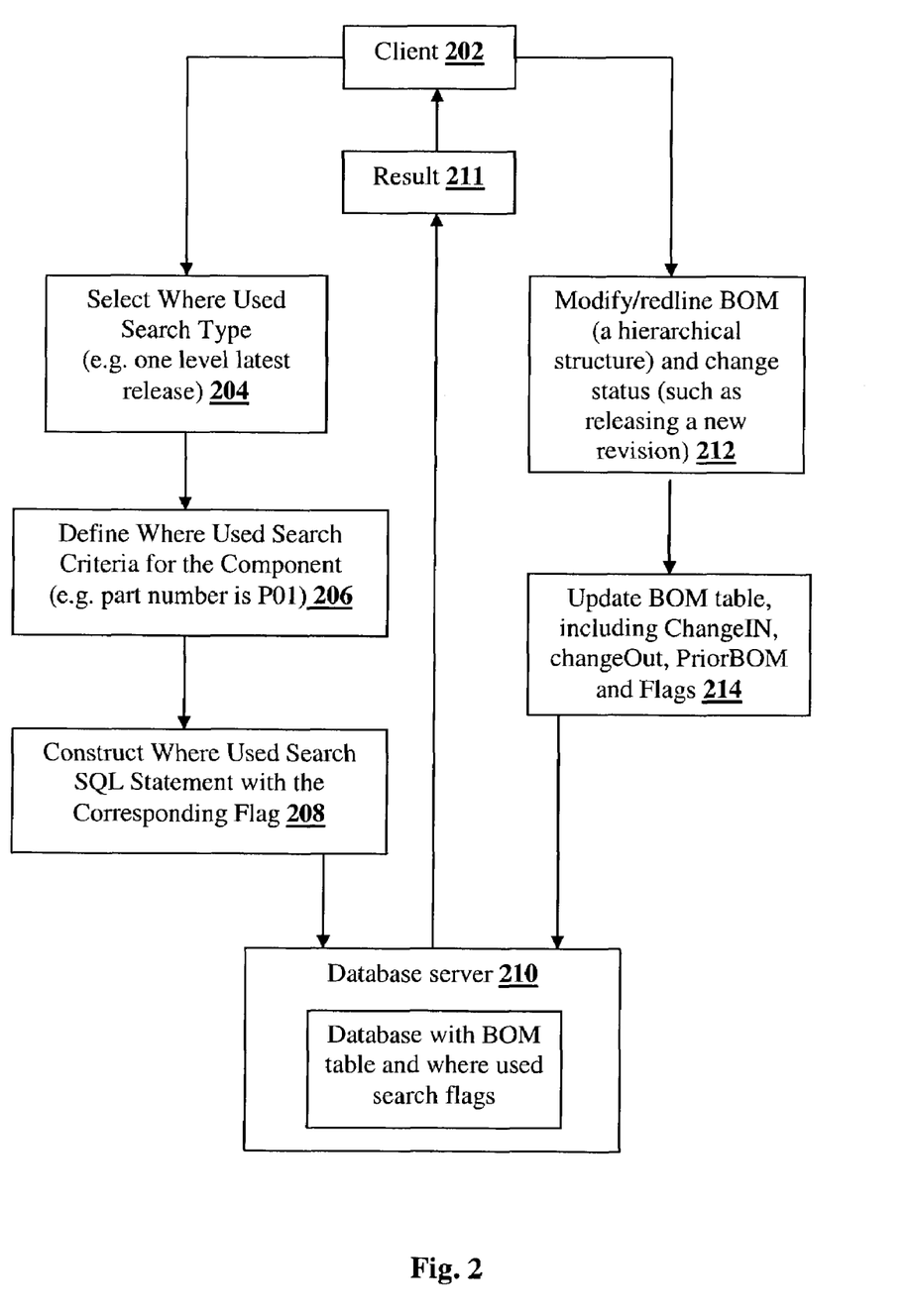
FIG. 2 is a flow diagram illustrating the processes of a where-used search in a multi-level hierarchical structure according to one embodiment of the invention.

Referring now to FIG. 2, a flow diagram illustrates a computer network system implementing a where-used search according to one embodiment of the invention. In operation, a user 202, which may be a person operating a terminal, or a system accessing a where-used system, inputs data to effect a where-used search. Such a search, for example, may be a search for direct and indirect uses of a component throughout a supply chain or other entity. A where-used search type is chosen in Step 204, such as a single level search of latest released assemblies for example. The where-used search criteria is then defined for the component in step 206, such as a particular part number for example. Then, in step 208, the where-used search Sequel statement is constructed that has the corresponding indicia, such as a flag, associated with the search. The search is then performed in the database in step 210. Here, the database is searched according to a search scheme, which is discussed in more detail below. A result 211 is then transmitted to the user in step 211. The system further includes the ability to modify the hierarchical structure, updating the structure according to the indicia scheme. In step 212, the structure is modified, such as modifying a BOM with a redline effect, and changing the status of an entity such as an object, indicating the release of a new revision for example. In step 214, the structure, such as a BOM table, is updated. Such an update may include changeIN where an object is added through a change process, changeOUT where an object is deleted or swapped out for another object (such as in a component being swapped out for a different component), priorBOM (indicating a former version of a BOM) and flag updates, discussed further below. The updates are then transmitted to the database server to update the appropriate tables and other data structures.

FIGS. 3A through 6B illustrate different indicia schemes for a system configured to perform where-used searches according to the invention. These schemes can allow for efficient where-used searching in a database or similar system, where queries are used to find direct as well as indirect associations of objects. When applied to a system for managing and controlling items such as components, sub-assemblies and assemblies, the where-used searches can help a company improve its inventory control, costs and common waste associated with inventory. If applied to a project management or other service type of system, it can help to save time, which is a universal resource in such systems, as well as wasted human and other resources.

Figure 3A:
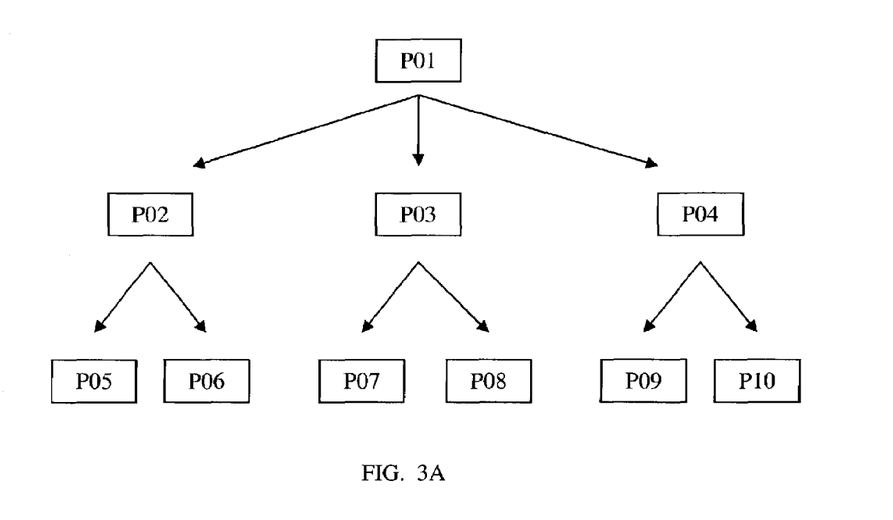
FIG. 3A is an example of a product line including multiple level hierarchical structure elements such as assembly, sub-assembly and components.

Referring now to FIG. 3A, an example of a product line including multiple level hierarchical structure elements such as assembly, sub-assembly and components is shown. A hierarchical system representation, such as a Bill of Material (BOM) table configured as one embodiment of the invention, may include a database that supports redline changes. For illustration purpose, consider a hierarchical relation illustrated in FIG. 3A. In FIG. 3A, an assembly P01 includes three sub-assemblies P02, P03 and P04. Each of the three sub-assemblies P02, P03 and P04 includes one or more child components. A sub-assembly P02 includes two components P05 and P06. A sub-assembly P03 includes two components P07 and P08. A sub-assembly P04 includes two components P09 and P10. In the hierarchical data structure in FIG. 3A, an assembly P02 is higher in hierarchy than children sub-assemblies P02, P03 and P04. Similarly, sub-assemblies P02, P03 and P04 are higher in hierarchy than components P05, P06, P07, P08, P09 and P10.

A parent object is immediately above a child object in the hierarchy; and, a child object is immediately below a parent object in the hierarchy. According to the embodiment illustrated in FIG. 3A is for illustration purpose; a hierarchical relation may have a different number of hierarchical levels and a different tree structure; and, the methods according to embodiments of the invention can be used for a general hierarchical relation.

Figure 3B:
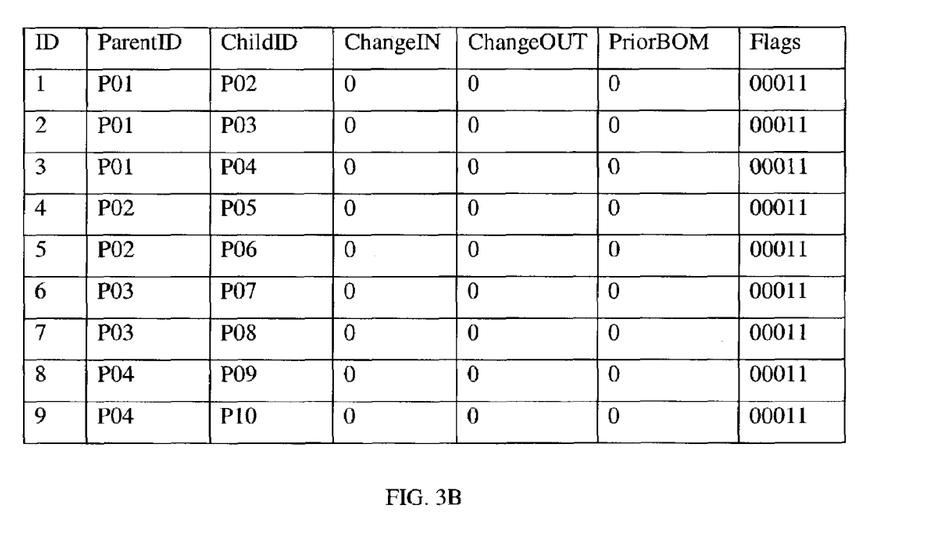
FIG. 3B is an example of a database of a bill of material (BOM) table of a product line including multiple level hierarchical structure elements assembly, sub-assembly and components.

Referring now FIG. 3B, an example of a Bill of Material (BOM) table for the hierarchical structure of FIG. 3A is illustrated. The columns of the BOM table in FIG. 3B, which supports redline changes, includes: ID, ParentID, ChildID, ChangeIN and ChangeOUT, a PriorBOM and Flags.

The ID indicates a specific row of a BOM table entry. Each row in a BOM table contains information for an object (e.g., an assembly, a sub-assembly or a component).

The ParentID indicates the identity of parent of the object of an entry. In the example of FIG. 3A, the parent of the object can be an assembly or a sub-assembly.

The ChildID indicates the identity of the object of an entry.

The ChangeIN indicates the timing of the addition of the object into the structure. In the example of FIG. 3B, "0" indicates that the object is originally present in the structure.

The ChangeOUT indicates the timing of the deletion of the object. In the example of FIG. 3B, "0" means the item is not deleted.

The PriorBOM indicates the ID of a base entry, based on where the change for the object of the entry is made.

The Flags indicate the states of the object (e.g., a component, a sub-assembly or an assembly) of the entry. The Flags according to embodiments of invention support the where-used search by flagging the status of changes or modifications in an efficient manner.

In the example of FIG. 3B, the where-used search flags entry includes five bits.

The first bit of the where-used search flags indicates the status of the parent of the object of the entry. When the parent of the object is marked "deleted" (e.g. deleted or redline deleted), the first bit is "1"; otherwise, "0".

The second bit of the where-used search flags indicates the status of the object of the entry. When the object is marked "deleted" (e.g. deleted or redline deleted), the second bit is "1"; otherwise, "0".

The third bit of the where-used search flags indicates whether or not the object is redline deleted. When a component has been redline deleted, the third bit "1"; otherwise, "0".

The fourth bit of the where-used search flags indicates whether the object is finalized (e.g., originally present in the structure, or in a released version). When the object is finalized, the fourth bit is "1"; otherwise, "0". For example, if the object is originally present in the structure, the fourth bit is "1". If the object is redline added into the structure, the fourth bit is "0" before a release. If the redline added object is released in an Engineering Change Order (ECO), it is then changed to "1".

The fifth bit of the where-used search flags indicates whether the object is the default release (e.g., the latest release).

| Bit | 1 | 2 | 3 | 4 | 5 |
|---|---|---|---|---|---|
| Default | 0 | 0 | 0 | 1 | 1 |
| Parent Deletion | 1 | 0 | 0 | 1 | 1 |
| Child Deletion | 0 | 1 | 0 | 1 | 1 |
| Redline Deletion | 0 | 0 | 1 | 1 | 1 |
| Pending Redline Addition | 0 | 0 | 0 | 0 | 1 |
| Redline Deletion | 0 | 0 | 1 | 0 | 1 |
| Flag of PriorBOM | 0 | 0 | 0 | 0 | 0 |
| Released Changes | 0 | 0 | 0 | 1 | 1 |

-continued

| Bit | 1 | 2 | 3 | 4 | 5 |
|-----|---|---|---|---|---|

Table 1 shows examples of five-bit flags that may represent different states of changes in a where-used search.

Figure 4A:
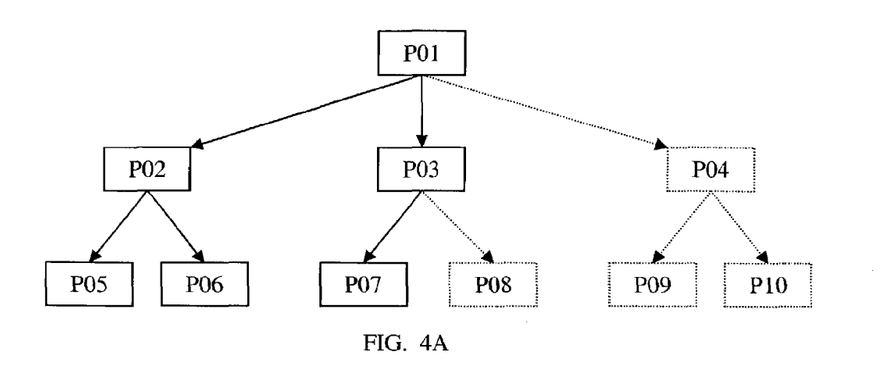
FIG. 4A is a product line in FIG. 3A where a sub-assembly and a component are deleted.

FIG. 4A is a product line in FIG. 3A, where a sub-assembly and a component are deleted directly by a user. An example of a where-used search according to one embodiment of the invention may include a direct deletion of a sub assembly P04 and a component P08.

An assembly P01 includes three sub-assemblies P02, P03 and P04, each of which includes components P05, P06, P07, P08, P09 and P10, respectfully. As shown in dotted line in FIG. 4A, sub-assembly P04 is deleted by a user making modifications 20 in FIG. 1. As a result, the components of sub-assemblies P04, P09 and P09 are deleted.

Similarly, a component P08, shown in dotted line, is deleted. A flag scheme shown in FIG. 4B according to one embodiment of the invention flags such a change in an efficient manner.

Figure 4B:
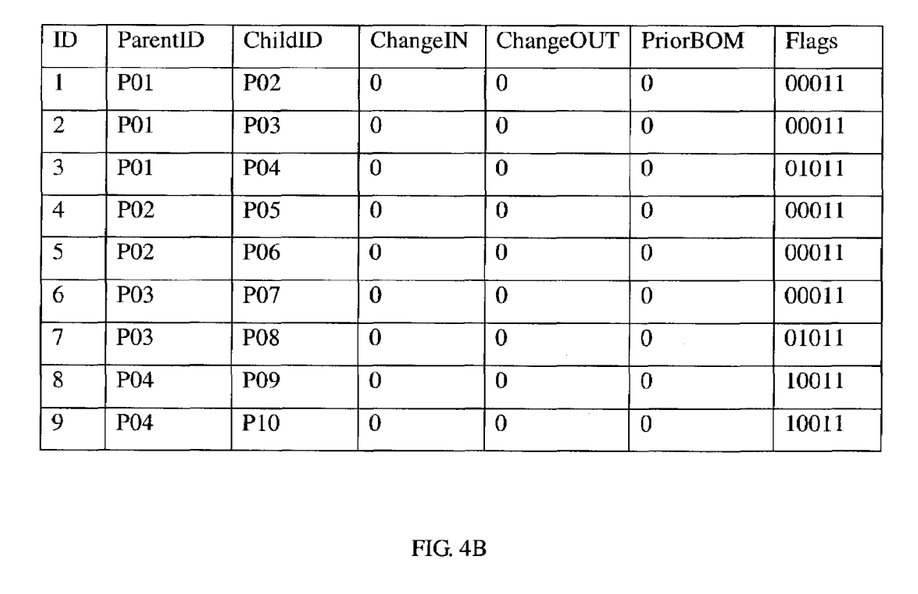
FIG. 4B is an example of a database of a BOM table implementing the deletion of a sub-assembly and a component.

FIG. 4B is an example of a database of a Bill of Material (BOM) table implementing that a sub-assembly and a component are deleted directly by a user. A database with flags according to the invention shows a deletion of a sub-assembly P04 and a component P08.

In the BOM table of FIG. 4B, the unchanged assembly P01, sub-assembly P02 and its two components P05 and P06, sub-assembly P03 and P07 remain in its default state "00011".

Row 3 includes a ParentID assembly P01 and a ChildID sub-assembly P04. Because sub-assembly P04 is a child object of an assembly P01, the deletion of a child object is flagged by changing the second bit from "0" to "1".

Row 7 includes a Parent sub-assembly IDP03 and a component ChildID P08. Similarly as in Row 3, a deletion of a component P08, a child objection, is flagged by changing the second bit from "0" to "1".

Row 8 includes a ParentID sub-assembly P04 and a ChildID component P09. A component P09 is deleted as a result of deletion of its parent sub-assembly P04. According to Table 1, a parent deletion is flagged by changing the first bit from "0" to "1".

Similarly, Row 8 includes a ParentID sub-assembly P04 and a ChildID component P10. A component P10 is deleted as a result of deletion of its parent sub-assembly P04. According to Table 1, a parent deletion is flagged by changing the first bit from "0" to "1".

In this way, a flag scheme according to one embodiment of the invention in FIG. 4B flags a deletion of a sub-assembly P04 and a component P08 in an efficient manner.

Figure 5A:
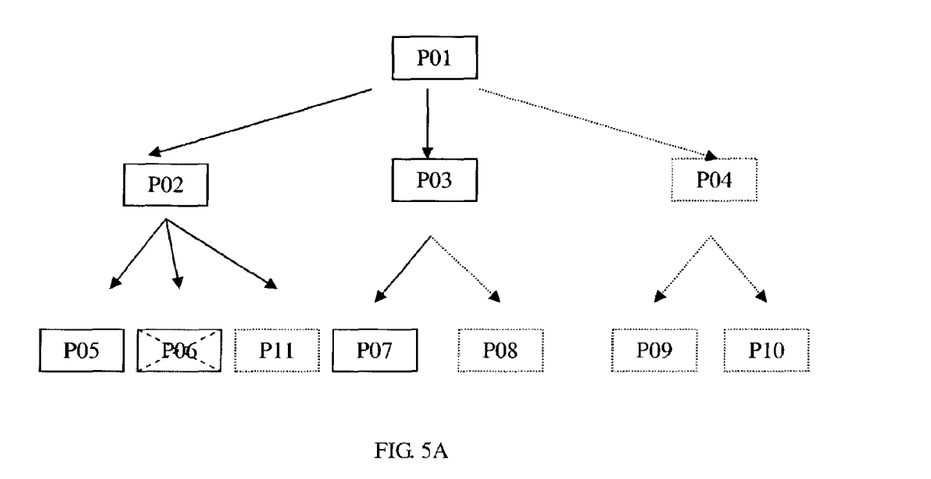
FIG. 5A is a product line in FIG. 3A where a change is created against a sub-assembly where one component of the sub-assembly is redline deleted and another is redline added.

FIG. 5A is a product line showing subsequent changes where a change is created against a sub-assembly and a component of the sub-assembly is modified indirectly due to the modification of the sub-assembly that has a higher hierarchy than the components that are redline deleted and added.

A product line in FIG. 5A is the same as the product line in FIG. 3A, but with changes accumulated after deletion of a sub-assembly P04 and a component P09 and P10. An assembly P01 includes three sub-assemblies P02, P03 and P04. Each of the three sub-assemblies P02, P03 and P0 includes one or more child components. A sub-assembly P02 includes two components P05 and P06. A sub-assembly P03 includes two components P07 and P08. A sub-assembly P04 includes two components P09 and P10.

Changes made against a sub-assembly P02 are designated as C1. The modifications of a sub-assembly P02 may result in indirectly modifications of its child objects such as a component P06. A component P06 of a sub-assembly P02 is redline deleted and a component P11 of a sub-assembly P02 is redline added. Redline addition of P11 is pending as a latest pending but not yet released, which is shown in a dotted line.

Figure 5B:
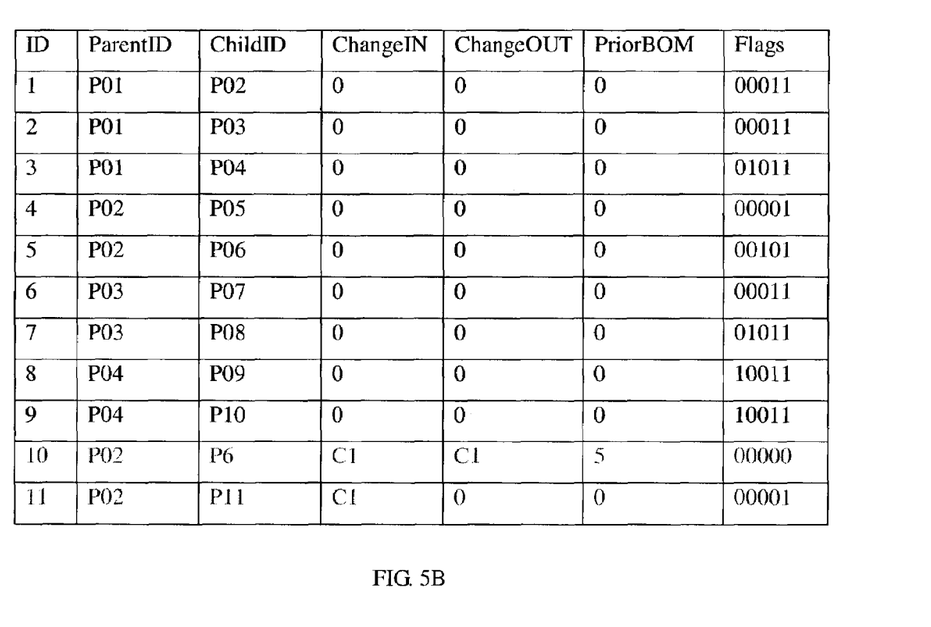
FIG. 5B is an example of a database of a BOM table implementing that an indirect change is created against a sub-assembly where one component of the sub-assembly is redline deleted and another is redline added.

The status of the indirect modifications of a component P06 and P11 may be indicated by a flag scheme according to embodiments of the invention illustrated in FIG. 5B.

FIG. 5B is an example of a database of a Bill of Material (BOM) table implementing a change created against a sub-assembly where one component of the sub-assembly is redline deleted and another is redline added when the redline addition is still pending. The flags in the BOM table indicate indirect modifications of child objects due to the modifications of parent objects.

In the BOM table of FIG. 5B, in addition to the existing changes in FIG. 4A, Row 5, Row 10 and 11 include new changes that are flagged by their corresponding five-bit flags, "00101", "00000" and "00001", respectively.

In Row 5, a sub-assembly P02 has a ParentID P02 and a component P06 has a ChildID P06. A component P06 is redline deleted, according to Table 1, which is flagged by changing the third bit from "0" to "1". In addition, because such a deletion is not released, the fourth bit flags the pending status by changing from "1" to "0".

In Row 10, a sub-assembly P02 has a ParentID P02, and a component P06 has a ChildID P06. A change C1 has been created against P02 and the redline deletion of P06 is thus recorded in ChangIN and ChangOut column. In addition, PriorBOM column includes the prior BOM table row number "5", which refers to a prior BOM table where changes are made. In this scenario, a flag containing five bits "0" shows that the flag in Row 10 should be the same as Row 5 of Prior BOM, which is "00101". Thus, indirect modifications of child objects P06 and P11 can be traced back to the changes in parent objects P02 and via PriorBOM column and a facilitating flag: "00000".

In Row 11, a sub-assembly P02 has a ParentID P02 and a component P011 has a ChildID P011. A change C1 has been created against P02 and thus recorded in ChangIN. Because the component P11 is redline added rather than deleted, ChangOUT column shows a "0". The pending changes of a redline addition of component P11 is shown by a "0" of the fourth bit of the flag.

In this way, a database of FIG. 5B flags a change C1 that is created against sub-assembly P02 and a pending status of redline deletion of component P06 and redline addition of component P11. Indirect modifications of child objects P06 and P11 can be traced back to the changes in parent objects P02.

Figure 6A:
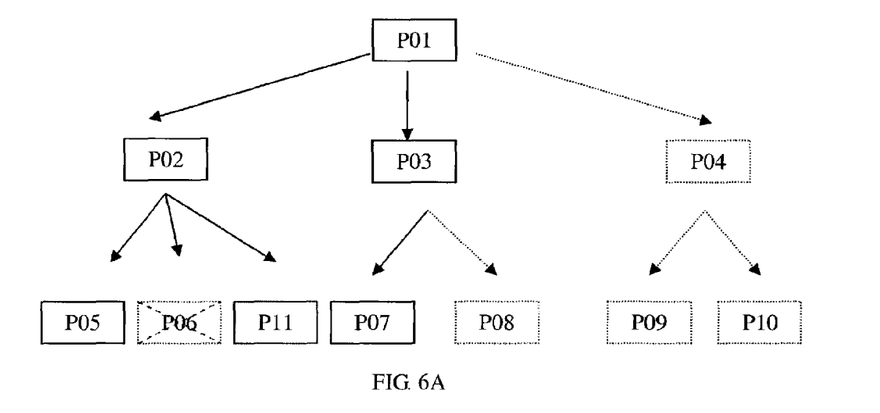
FIG. 6A is a product line in FIG. 5A where a change is released to result in a revision Rev. "A".

FIG. 6A is a product line in FIG. 5A showing subsequent changes where a change C1 is released to create a revision Rev. "A" as a result. All prior changes are included in a database of FIG. 6A. Different from FIG. 5A, the pending changes of subassembly P02 are released and finalized. The released changes are represented by dotted line of a component P06, which is deleted and solid line of a component P11, which is added.

Unlike prior art, the flag scheme of the embodiments of the invention is capable of indicating the released modifications of components P06 and P11 as a second revision following a first revision of pending changes against the parent objects sub-assembly P02.

Figure 6B:
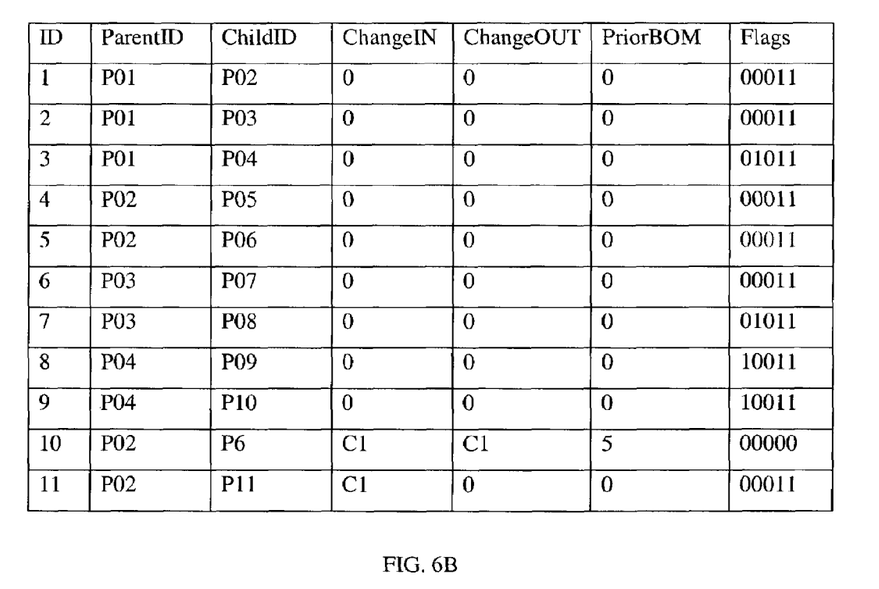
FIG. 6B is an example of a database of a BOM table implementing the creation of a change C1 that is finally released resulting in a revision Rev. "A".

FIG. 6B is an example of a database of a Bill of Material (BOM) table implementing that a change C1 is released to create a Revised Version "A" as a result. In FIG. 6B, the flags according to the embodiments of the invention indicate a second revision of the modifications made to the database following a first revision in FIG. 5B.

In Row 5, a sub-assembly P02 has a ParentID P02 and a component P06 has a ChildID P06. A component P06 is redline deleted, according to Table 1, which is flagged by changing the third bit from "0" to "1". In addition, because a deletion is released from pending status, the fourth bit flags the final released status by changing from "0" to "1".

In Row 11 of FIG. 6B, a sub-assembly P02 has a ParentID P02 and a component P011 has a ChildID P011. A change C1 has been created against P02 and thus recorded in ChangIN. Because the component P11 is redline added rather than deleted, ChangOUT column shows a "0". In addition, because a redline addition of the component P11 is released from pending status, the fourth bit of the flag shows a change from "0" in FIG. 5B to "1".

In this way, a database of FIG. 6B according to one embodiment of the invention flags a release of change C1 resulting a revision Rev "A" and records multiple revisions of indirect changes in an efficient manner.

According to one embodiment, multiple revisions of direct or indirect changes may include 1) a single-level where-used, latest released reversion; 2) a single-level where-used, latest revision; 3) a single-level where-used, all released revisions; 4) an all-level where-used, latest released revision; and 5) a top-level where-used, latest released revision.

In a where-used search, the search conditions are used to define only the types of objects that might appear on the BOM of an assembly. Different types of objects that might appear on the BOM of an assembly may include objects in the Items super-class; objects in the parts class; objects in user-defined parts sub-class; objects in the document class; and object in user-defined document subclasses. These types of where-used searches conditions can be stated in SQL statements.

For a single-level where-used, latest released reversion search condition, an example of a SQL statement may be as following:

select distinct a.id, a.item_number,<item_attributes>, <bom_attributes> from bom b, item a
    where b.component=:1 and b.change_out=0 and b.flags like '00011%' and b.item=a.id;

Examples of a single-level where-used, latest released reversion are the following: 1) In a preliminary BOM table of FIG. 3A, a component P11 has not yet been added to a component; 2) In FIG. 5A, a change C1 is created against a sub-assembly P02 but the change C1 is pending with component P11 not yet added to the product line; and 3) In FIG. 6A, the change C1 is released and the component P11 is added as a revision Rev. "A". In these examples, only a single-level of sub-assembly is searched.

For a single-level where-used, latest revision search condition, an example of a SQL statement may be as following:

select distinct a.id, a.item_number,<item_attributes>, <bom_attributes> from born b, item a
    where b.component=:1 and b.change_out=0 and b.flags like '000_1%' and b.item=a.id;

An example of single-level where-used, latest revision is that in FIG. 5A, a sub-assembly P02 has a pending change C1, the redline addition of component P11, that is created but not yet released. In this example, only a single-level of sub-assembly is searched.

For a single-level where-used, all released revisions search condition, an example of a SQL statement may be as following:

select distinct a.id, a.item_number,<item_attributes>, <bom_attributes> from bom b, item a
    where b.component=:1 and b.flags like '00_1%' and b.item=a.id;

An example of a single-level where-used, all released revisions search condition is that in FIG. 6A, a change in component P02, the redline addition of component P11, is released with a Revised "A". In this example, only a single-level of sub-assembly is searched.

For an all-level where-used, latest released rev search condition, an example of a SQL statement may be as following:

select distinct item, component, level, <bom_attributes> from bom
    where change_out=0 and flags like '00011%'
    connect by prior item=component start with component=: 1);
    select id,<item_attributes> from item where id=:1;

An example of an all-level where-used, latest released rev search condition is that in FIG. 6A, in an assembly P01 including a sub-assembly P02 and a component P11, the change C1 has been released with revision Rev. "A". In this example, a search is performed at all levels including assemblies, sub-assemblies and components.

For a top-level where-used, latest released rev search condition, an example of a SQL statement may be as following:

select item, component, <bom_attributes>from bom
    where change_out=0 and flags like '00011%'and not exists
    (select null from bom a where bom.item=a.component)
    and id in (select id from bom where flags like '00011%' connect by prior item=component start with component=: 1);
    select id,<item_attributes>from item where id=:1;

An example of a top-level where-used, latest released rev search condition is that in FIG. 6A, in an assembly P01 including a sub-assembly P02 and a component P11 wthe change C1 has been released with revision Rev. "A". In this example, a search is performed only at the top level including assemblies.

The invention may involve a number of functions to be performed by one or more computer processors, such as a microprocessor or and old legacy mainframe computer. The microprocessor may be included in many different forms of computers such as severs and personal computers. The microprocessor may be a specialized or dedicated microprocessor that is configured to perform particular tasks by executing machine readable software code that defines the particular tasks. Applications, data processors, data generators, and other devices will be described that are embodied in a computer in the form of computer readable code that, when executed by a computer, configures the computer to perform the functions of these entities. The microprocessor may also be configured to operate and communicate with other devices such as direct memory access modules, memory storage devices, Internet related hardware, other computers and other devices that relate to the processing and transmission of data in accordance with the invention. The software code may be configured using software formats such as Java, C++, XML and other languages that may be used to define functions that relate to operations of devices required to carry out the functional operations of a computer that employs the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of computers that utilize the invention, there exist different types of memory devices for storing and retrieving information while performing functions according to the invention. Cache memory devices are often included in such computers for use by the central processing unit as a convenient storage location for information that is frequently stored and retrieved. Similarly, a persistent memory is also frequently used with such servers for maintaining information that is frequently retrieved by a central processing unit, but that is not often altered within the persistent memory, unlike the cache memory. Main memory is also included in such servers for storing and retrieving larger amounts of information such as data and software applications configured to perform functions according to the invention when executed by the central processing unit. The main memory may be a disk drive or other volatile memory device. These memory devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory device, nor any commonly used protocol for storing and retrieving information to and from these memory devices respectively.

Although the description above uses language that is specific to structural features and/or methodological acts, it is to be understood that the invention defined in the appended claims is not limited to the specific features or acts described. Rather, the specific features and acts are disclosed as exemplary forms of implementing the systems and methods discussed herein.

The invention claimed is:

1. A method of searching a database including a BOM table, the BOM table including a set of first level objects, wherein each first level object of the set of first level objects includes a set of second level objects, comprising:
   associating a first set of state indicia with each first level object of the set of first level objects, the first set of state indicia including a first object status, the first object status including one of a deleted status and a non-deleted status;
   associating a second set of state indicia with each second level object of the set of second level objects, the second set of state indicia including the first object status and a second object status, the second object status including one of the deleted status and the non-deleted status;
   executing a query on the BOM table, wherein when the query includes a non-deleted status criteria, at least one of a third set of first level objects that do not include the deleted status, and a fourth set of second level objects that do not include the deleted status, is returned.

2. A method according to claim 1, wherein:
the first set of state indicia furthers includes a third object status, the third object status including a redline deleted status and a redline non-deleted status; and
the second set of state indicia furthers includes a fourth object status; the fourth object status including the redline deleted status and the redline non-deleted status.

3. A method according to claim 1, wherein:
the first set of state indicia furthers including a fifth object status, the fifth object status including a finalized status and a non-finalized status; and
the second set of state indicia furthers including a sixth object status, the sixth object status including a finalized status and a non-finalized status.

4. A method according to claim 1, wherein:
the first set of state indicia furthers including a seventh object status, the seventh object status including a default release status and a non-default release status; and
the second set of state indicia furthers including the eighth object status, the eighth object status including a default release status and a non-default release status.

5. A method according to claim 4, wherein the the set of first level objects and the set of second level objects comprise at least one of:
   a part, an assembly, a sub-assembly, a product, a service, a component, an element and processes.

6. A method according to claim 1, wherein the columns of the database comprise information about modifications to the objects.

7. A method according to claim 1, wherein the first set of state indicia includes a plurality-of five-bit flags.

8. A method according to claim 1, wherein the the second set of state indicia includes a plurality of five-bit flags.

9. The method of claim 1, wherein the BOM table includes a set of columns, the set of columns including one of an ID, a ParentID, a ChildID, a ChangeIN, a ChangeOUT, a PriorBOM, the first set of state indicia, and the second set of state indicia.

10. A method of executing a where-used query on a database including a set of BOMs, the BOMs including a set of first level objects, wherein each first level object of the set of first level objects includes a set of second level objects, comprising:
    associating a first set of state indicia with each first level object of the set of first level objects, the first set of state indicia including a first object status, the first object status including one of a deleted status and a non-deleted status, the first set of state indicia further including a second object status, the second object status including one of a finalized status and a non-finalized status;
    associating a second set of state indicia with each second level object of the set of second level objects, the second set of state indicia including the first object status and a third object status, the third object status including one of the deleted status and the non-deleted status, the second set of state indicia further including a fourth object status, the fourth object status including one of the finalized status and the non-finalized status;
    executing the where-used query on the set of BOMs, wherein when the where-used query includes a non-deleted status criteria, at least one of a third set of first level objects that do not include the deleted status, and a fourth set of second level objects that do not include the deleted status, is returned.

11. A method according to claim 10, wherein:
the first set of state indicia furthers including a fifth object status, the fifth object status including a default release status and a non-default release status; and the second set of state indicia furthers including a sixth object status, the sixth object status including a default release status and a non-default release status.

12. The method of claim 10, wherein each BOM of the set of BOMs includes a set of columns, the set of columns including one of an ID, a ParentID, a ChildID, a ChangeIN, a ChangeOUT, a PriorBOM, the first set of state indicia, and the second set of state indicia.

* * * * *